United States Patent
Lacherade et al.

(10) Patent No.: US 7,149,281 B2
(45) Date of Patent: Dec. 12, 2006

(54) METHOD AND DEVICE FOR MOUNTING A ROTATING MEMBER

(75) Inventors: Xavier Armand Lacherade, Versailles (FR); Caroline Le-Pierrard, Le Mesnil Saint Denis (FR); Jean-Luc Josse, Neulilly Plaisance (FR)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 10/825,512

(22) Filed: Apr. 15, 2004

(65) Prior Publication Data

US 2004/0240615 A1 Dec. 2, 2004

(30) Foreign Application Priority Data

Apr. 17, 2003 (FR) .................... 03 50113

(51) Int. Cl.
*H01J 35/10* (2006.01)
(52) U.S. Cl. ....................... 378/132; 403/372
(58) Field of Classification Search ............... 378/132, 378/133; 464/170, 178; 384/215; 267/161, 267/162; 403/367, 372
See application file for complete search history.

(56) References Cited

U.S. PATENT DOCUMENTS

| | | | | |
|---|---|---|---|---|
| 246,846 A | * | 9/1881 | Wilde | ..................... 403/367 X |
| 1,554,781 A | * | 9/1925 | Blecker | |
| 1,833,145 A | * | 11/1931 | Wilhelm | |
| 2,640,168 A | | 5/1953 | Agule | |
| 2,785,453 A | * | 3/1957 | Wentz | ..................... 403/372 X |
| 3,271,053 A | * | 9/1966 | Kurachi | ................... 403/372 X |
| 3,394,972 A | * | 7/1968 | Bossler, Jr. | |
| 4,130,926 A | * | 12/1978 | Willem | |
| 4,210,371 A | | 7/1980 | Gerkema et al. | |
| 4,286,894 A | * | 9/1981 | Rongley | ..................... 403/372 |
| 4,472,156 A | * | 9/1984 | Orain | |
| 4,635,283 A | * | 1/1987 | Starek et al. | ................ 378/132 |
| 6,888,923 B1 | * | 5/2005 | Dahan et al. | ................ 378/132 |

FOREIGN PATENT DOCUMENTS

| | | |
|---|---|---|
| DE | 90 17 291 U | 3/1991 |
| EP | 0 483 005 A | 4/1992 |
| FR | 2 518 805 A | 6/1983 |
| FR | 2 717 619 A | 9/1995 |

\* cited by examiner

*Primary Examiner*—Greg Binda
(74) *Attorney, Agent, or Firm*—Cantor Colburn LLP

(57) ABSTRACT

A rotating anode is mounted on a shaft of an X-ray tube by means of a ring. The ring allows expansion and reduces the hyperstatic state of the assembly. The ring has the shape of a diabolo, preferably that of a hyperboloid structure generated by revolution. The ring dampens vibration phenomena in a shaft bearing the rotating anode and reduces noise-creating phenomena.

61 Claims, 3 Drawing Sheets

METHOD AND DEVICE FOR MOUNTING A ROTATING MEMBER

CROSS-REFERENCE TO RELATED APPLICATIONS

This application claims the benefit of a priority under 35 USC 119(a)–(d) to French Patent Application No. 03 50113 filed Apr. 17, 2003, the entire contents of which are hereby incorporate by reference.

BACKGROUND OF THE INVENTION

The present invention is directed to a method and a device for mounting a rotating member. In particular, the present invention is directed to a source of radiation and, more particularly the mounting of a rotating anode in an X-ray tube and a method for manufacturing a part of this device. The rotating anode tubes are X-ray emitting tubes used mainly in mammography, although their use can be envisaged in other fields of radiology, especially tomodensitometry. In mammography, the conditions of the examination require the patient to place his or her breast on a breast-support tray. An X-ray emitting device, generally placed on a vertical column that bears the breast-support tray, is placed close to the patient's head. This proximity not only dictates particularly strict constraints of electrical installation, but also requires that the X-ray tube should not vibrate, so as not to inconvenience the patient during an examination that moreover is a stressful experience. These vibrations are noisy. In general, they are especially present as the sheathing of the tube is metallic and is itself sensitive to vibrations.

In practice, an X-ray tube with rotating anode has an anode rotating at high speed. The anode is positioned so that, on one side, it faces a cathode and, on the other, a window that is vacuum-tight but enables the passage of the emitted X-rays. The rotation of the anode is prompted by a rotor working by means of bearings. The rotor drives the rotating anode to which it is fixedly joined. Despite all the efforts made to balance this rotating part, there are imbalances that contribute to making the entire tube vibrate. The shaft is fixed in the tube by being fixed at both its ends. The shaft is thus fixed to a first structure, namely a first part of the sheathing of the tube, on one side and to a second structure, namely a second part of the sheathing, on the other side. The two structures are then linked to each other. If the linking of the structures is rigid, such an assembly leads to a hyperstatic condition in the holding of the shaft and, at a mechanical level, it entails breaks that are unacceptable. To overcome this drawback, one end of the shaft is mounted in a structure that is, in principle, the lightest and/or least rigid type of structure, using a ring that allows certain degrees of freedom. The rings used, which generally have a squirrel-cage shape, are elastic but have the drawback of not being reusable. Indeed, the rings are deformed because they have to be force-fitted when mounted in a structure, before the insertion of a shaft end. Furthermore, the insertion of the rings themselves requires an exertion of considerable force during assembly.

The value of the rings is that they resolve the problems related to the hyperstatic condition and furthermore allow the expansion caused by the heating of the anode. However, they do not resolve the problem of vibrations, which continue to be a source of problems for the patient and may even lead to faulty precision in the radiological images acquired.

BRIEF DESCRIPTON OF THE INVENTION

An embodiment of the invention is directed to the problems of vibration and the re-utilization of the rings. In an embodiment of the invention the rings are diabolo-shaped rings. The diabolo-shaped rings are supported in a housing in the structures by means of end crowns. They hold the shaft inside the diabolo by means of a narrowed central part of the diabolo. In an embodiment by making the diabolos in an open shape, the ring can be adapted to the manufacturing tolerance values of the bores that receive the ends of the shaft. The insertion of the rings therefore no longer necessitates any excessive force fitting. The rings can consequently be re-utilized. In an embodiment of the invention the diabolo is hyperboloid shape.

An embodiment of the invention is directed to a method for making the diabolo-shaped rings so that the cost of their manufacture is reduced to the minimum. In an embodiment of the method, the diabolo shape is a hyperboloid shape.

An embodiment of the invention is a device for mounting a rotating anode in an X-ray tube comprising, in a first structure, a bore, a ring housed in this bore, with one end of a shaft of the rotating anode inserted in this ring, wherein the ring comprises a diabolo shape generated by revolution about an axis of the shaft.

An embodiment of the invention is a method for the manufacture of a diabolo comprising: forming a diabolo from a cylinder; forming beams in one wall of the diabolo wherein the beams being could be inclined.

BRIEF DESCRIPTON OF THE DRAWINGS

An embodiment of the invention will be understood more clearly from the following description and the accompanying figures. The figures are given purely by way of an example and in no way restrict the scope of the invention. Of these figures:

FIG. 1 is a schematic view of the device for mounting a rotating anode;

FIGS. 2 to 6 exemplify the making of a hyperboloid structure generated by revolution fulfilling the role of a diabolo;

DETAILED DESCRIPTION OF THE INVENTION

Figure 1:
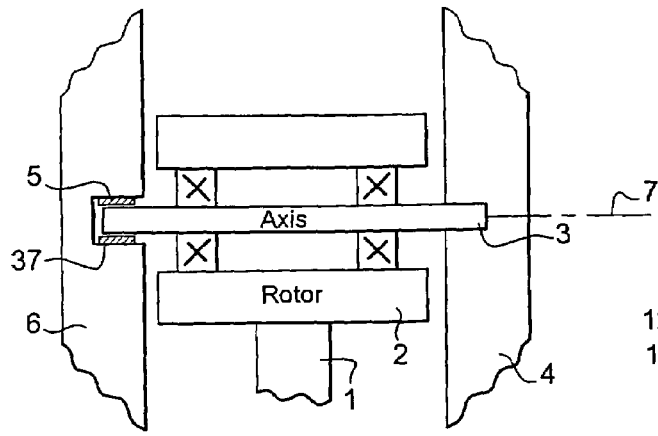

FIG. 1 shows a device for mounting a rotating member such as an anode 1 in an X-ray tube. The X-ray tube itself is not shown. The rotating anode 1 is thus rigidly mounted on a motor-driven rotor (preferably a brushless electric motor) about a shaft 3. The shaft 3 is mounted, for example rigidly, in a first fixed structure 4 and by means of the ring 5, in a second structure 6. A rotor 2 and the rotating anode 1 rotate about an axis of rotation 7 aligned with the shaft 3. In this example, the shaft 3 is rigidly fixed to the structure 4 by known means. For example, it is screwed into the structure with a screw. The structures 4 and 6 are furthermore connected in the sheathing of the X-ray tube so that they are fixed with respect to each other. In practice, one of the two structures, in this case the structure 4, is massive. The other structure, namely the structure 6, is lighter. In any case, the structure 4 is less sensitive than the structure 6 to the vibratory forces generating an acoustic source. This type of assembly gives rise to vibrations transmitted by the shaft 3 to the structure 6, which then sends out disturbing noises despite the presence of the ring 5.

Figure 5:
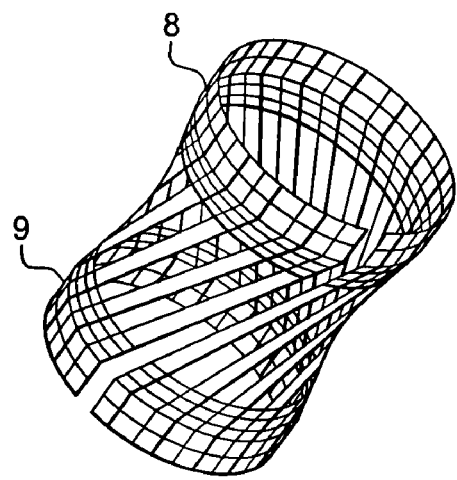
Figure 6:
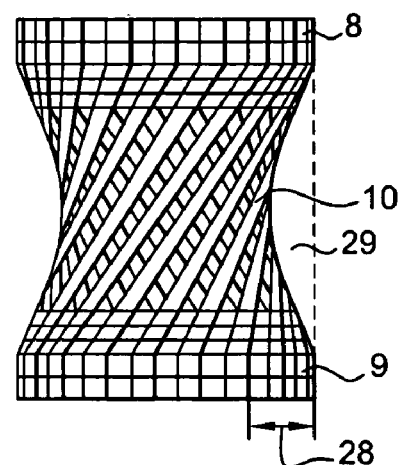

In an embodiment of the invention, the ring 5 has a diabolo shape generated by revolution about an axis that is the axis 7 of the shaft 3. This shape is shown in FIGS. 5 and 6. Such an axis comprises a first crown 8 and a second crown 9, both circular and cylindrical, with generatrix lines parallel to the axis 7 of the shaft 3. These crowns 8 and 9 are connected to each other by a set of beams that, in this embodiment are inclined as shown at 10. It is possible however to provide non-inclined beams but, as shall be seen here below, the inclination of the beams better ensures the integrity of the ring when it is being used. The mounting of the diabolo between the shaft 3 supporting the rotating elements and the structure 6 of the sheathing of the tube then gives the desired noise attenuation.

Figure 2:
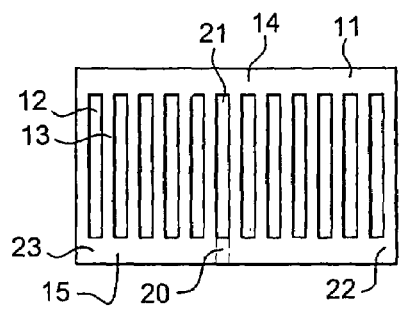
Figure 10A:
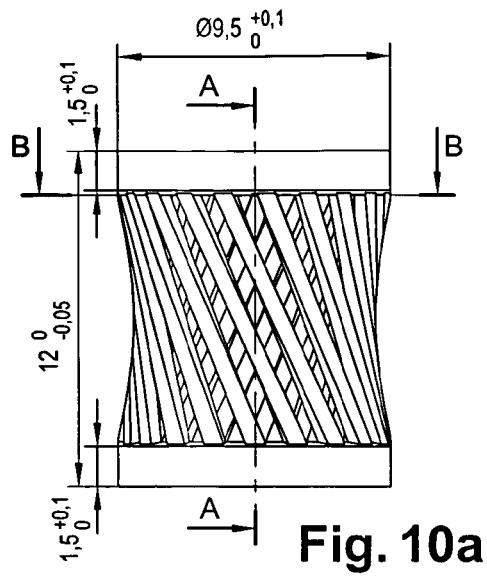
FIGS. 10a to 10e show dimensions of a hyperboloid diabolo.

Several methods for manufacturing the diabolo-shaped ring of the invention are possible. By way of example, dimensions and shapes of the ring shall be specified with reference to FIGS. 10a to 10c. FIG. 2 shows a plate 11, for example, a thin plate made of metal or an alloy, or even a composite material in which straight slots 12 are made, enabling the beams 13 to be individualized between each of the slots. The slots 12 and beams 13 are rectilinear, and in this example, they are oriented at right angles to the direction of two lintels 14 and 15 that connect the beams 13 to one another. The slots 12 can be cut out in this manner by laser, matrix punching, etching or other similar methods.

Figure 3:
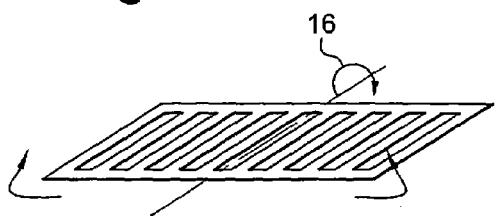
Figure 4B:
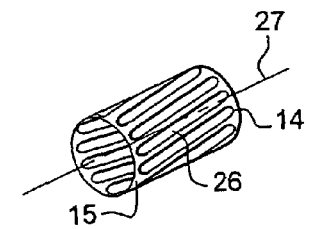
Figure 4A:
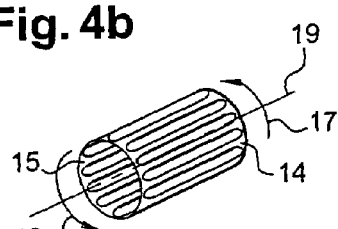

Once the cutting-out operations have been performed, as shown in FIG. 3, a plate 11 is formed by making it turn about a circular cylindrical chuck oriented along an axis 16 parallel to the directions of the slots 12 and of the beams 13. After shaping, the ends of the lintels 14 and 15 can be soldered together so that the ring is closed. Herein below, an embodiment is described where the ring can be left open. Once this cylinder is shaped, as seen in FIG. 4a, the ring thus shaped is twisted by making the lintels 14 and 15, which are now circular, rotate in counter-rotational directions, 17 and 18 respectively, about an axis 19 parallel to the directions of the slots 12 and beams 13. The structures obtained are shown in FIGS. 5 and 6 in which the lintels 14 and 15 occupy the places of the crowns 8 and 9 respectively. The twisting solution is one solution but other equivalent techniques are possible.

For the making of an open ring, make an aperture 20 (FIG. 2) in a lintel, for example, the lintel 15. This aperture can be made as a prolongation of a central slot 21. After shaping about the axis 16, the ends 22 and 23 of the lintel 15 are joined together, for example by soldering, while the corresponding ends of the lintel 14 are not joined.

Figure 11:
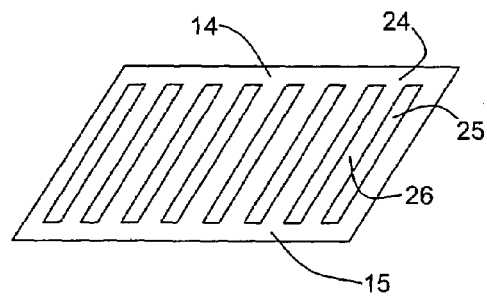
FIG. 11 depicts an alternative arrangement to the plate depicted in FIG. 2.

Another procedure may comprise the use of a parallelogram-shaped plate 24 rather than that of a rectangular plate 11. In this plate 24, the slots 25 are inclined, as also the beams 26, relative to the normal to the lintels 14 and 15 (shown in FIG. 11). The plate 24 then undergoes the same operation of shaping about a chuck with an axis 16 perpendicular to the lintels 14 and 15. This leads to the making of a cylindrical ring, shown in FIG. 4b, in which the beams 26 are not oriented as the generatrix lines of the cylinder but are shaped in a helix on the rim of the cylinder. Once this cylindrical ring is obtained, it can be stressed in a shaping mold. The mold on the whole has the negative shape of the diabolo to be made, so that the beams 26 are forced to bend towards the interior of the ring, in the direction of the axis 27 of the ring.

In one example, the inclination of the beams 26 on the lintels 14 and 15 may be about 50° plus or minus 10°. The mold that receives the ring of FIG. 4b is a mold having a shape generated by revolution with an axis of revolution orthogonal to the directions of the lintels 14 and 15.

In another embodiment for making the diabolo, it is also possible to start from a thick cylinder, for example with a thickness 28, as shown in FIG. 6. By lathing, it is then possible, in this thick cylinder, to obtain concavity by removing portions 29 from the diabolo, as also excess thickness from the crowns 8 and 9, inside the diabolo. Once this diabolo is thus made, it is possible especially by laser cutting to individualize the beams 10 between the crowns 8 and 9.

The molding method and the hollowing-out method do not necessarily lead to a hyperboloid diabolo. The twisting method leads to it naturally.

Figure 7:
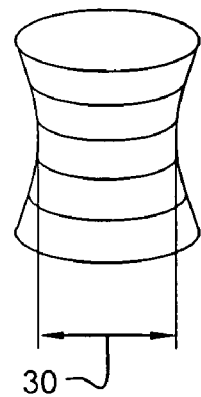
FIGS. 7 to 9 illustrate the effects of the mounting of the diabolo in the mounting device.
Figure 8:
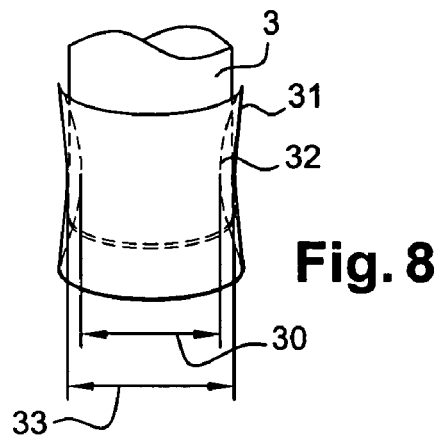

Whatever the method of manufacture used, it leads to the positioning of beams 10 inside the diabolo. These beams set up a narrowing of the available space within the diabolo while they are also attached, on both sides of this diabolo, to elements having circumferences of greater diameter. To this effect, FIGS. 7 and 8 show the inner diameter of the diabolo, respectively before 30 and after 33 the insertion of the shaft 3. In FIG. 8 especially, solid lines indicate the curves 31 of the sheaths of the beams 10 while dashes 32 indicate the same sheaths before insertion. It is seen that the initial diameter 30 has widened to become the diameter 33 receiving the shaft 3. The differences of curvature 31 and 32 constitute the elasticity that holds the end of the shaft 3 in the structure 6 (FIG. 1).

Figure 9:
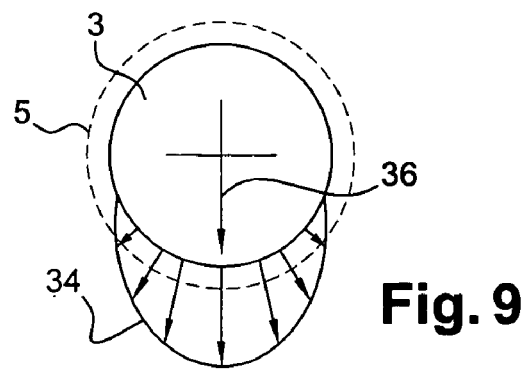

FIG. 9 shows a diagram of forces, with a sinusoidal amplitude, occurring when the shaft 3 is subjected to radial forces. The distribution 34 of the stresses and their evaluation is such that it enables the thickness of the ring 5, typically the thickness of the plate 11 or the plate 24, to be chosen. It also makes it possible to define the angles of inclination of the beams 10 relative to axes 7, 19 or 27. It also enables the number of beams 13 to be defined. Finally, it enables the nature of the material, especially its Young's modulus, to be defined. These elements are furthermore determined as a function of the desired difference in flexion, namely the difference between the curvatures 31 and 32 or between the diameters 30 and 33.

Figure 10B:
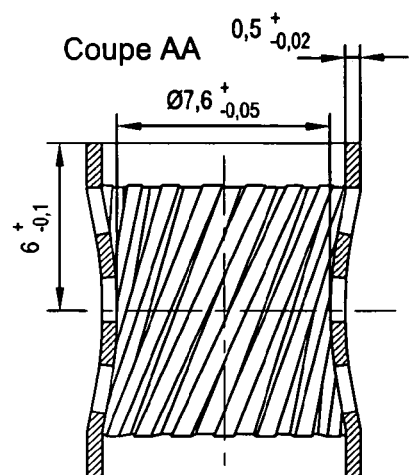
Figure 10D:
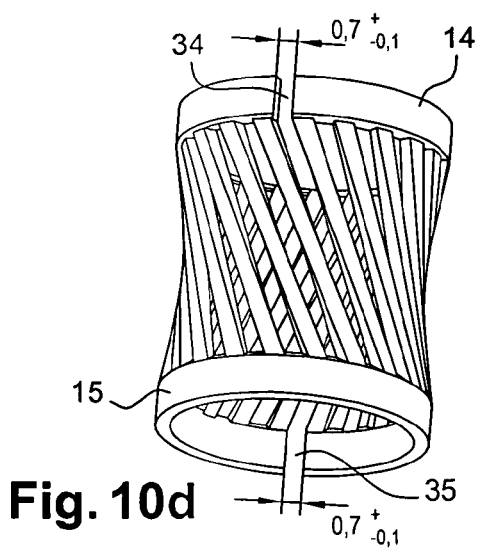
Figure 10E:
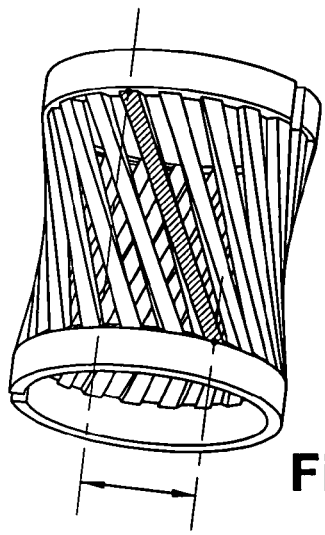
Figure 10C:
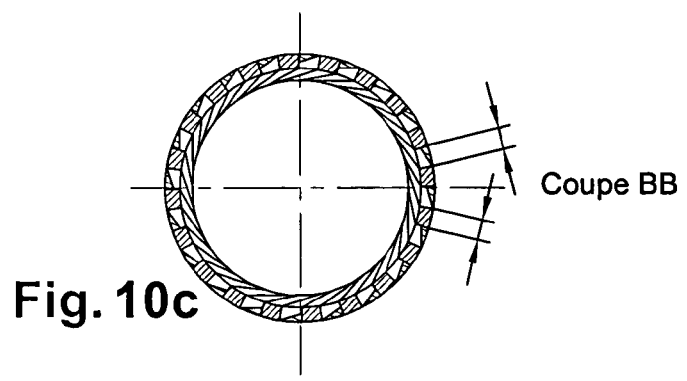

FIGS. 10a to 10e show a particular embodiment of a ring having a hyperboloid shape. FIG. 10b is a sectional view along the direction AA of FIG. 10a, while FIG. 10c is a sectional view along the direction BB. FIGS. 10d and 10e are views in perspective. All these figures show that the ring has twenty slots and therefore twenty beams. This ring which, in one example, has been obtained by the third method described, has hyperboloid beams with a twist angle of 50°±5° as shown in FIG. 10e. The angle is measured in relation to an axis of revolution of the hyperboloid. In one example, the inner diameter of the ring is 7.6 mm with a tolerance of $5/100^{th}$, the external diameter of the ring being equal to 9.5 mm with a tolerance of $10/100^{th}$. FIG. 10e shows that the twist angle may be 50°±5° relative to a plane perpendicular to the axis of the shaft. FIG. 10c shows that the slots have a width of 0.79 mm, plus or minus $5/100^{th}$ mm, while the beams have a width of 0.7 mm plus or minus $5/100^{th}$ and a thickness of 0.5 mm plus or minus $2/100^{th}$. In one example, the height of the ring is about 12 mm, plus or minus $5/100^{th}$; the height of the rings 8 and 9 formed from the lintels 14 and 15 being in the range of 1.5 mm plus or minus $^{10}/_{100}{}^{th}$. The thickness of the plate can be, for example, between 0.3 mm to 1.0 mm. Further, by way of example, the twist angle to form the hyperboloid ring may be less than or greater than 50° depending on the diameter reduction desired. For example, the twist angle can be about 60° (low diameter reduction) or about 90° (high diameter reduction).

In the embodiment shown in FIG. 10d the ring is open, especially at the position of the slots and has a first aperture 34 formed in the lintel 14. The aperture 34 is diametrically opposite to an aperture 35 formed in the lintel 15. The diametrical opposition is evaluated in relation to the axis of revolution of the hyperboloid structure, which is not shown here. Consequently, whatever the directions 36, as shown in FIG. 9, of the forces exerted on the shaft 3, the response of the ring will be identical. There is no neglected direction, which is what would occur with open rings.

The opening of the ring enables the insertion of the ring 5 into the bore 37 made in the structure 6. The narrowing of the aperture 34 and/or the aperture 35 enables insertion and, furthermore, wedging. Furthermore, the narrowing makes it possible to accept a greater tolerance in the making of the bore that receives the end of the shaft 3 in the structure 6.

Figure 12:
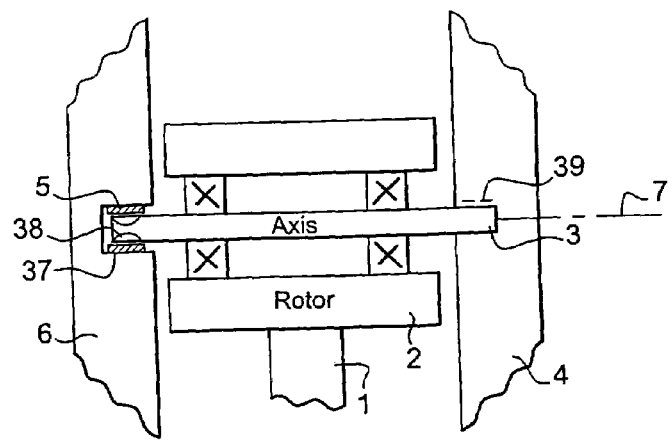
FIG. 12 depicts an alternative arrangement to the device depicted in FIG. 1.

As shown in FIG. 12, the embodiments make it is possible to obtain a particularly simple longitudinal holding of the shaft 3, by making a cavity 38 generated by revolution in this shaft 3 at the position that has to receive the ring 5. This cavity 38 would have, for example, a curvature that is intermediate between the curvatures 31 and 32. If need be, on the other side, in the rigid structure 4, it is also possible to make another bearing with the same ring 39 to also hold the other end of the shaft 3 which, in this case too, would be provided with a cavity generated by revolution. In this case, especially with the cavities, a controlled positioning of the shaft 3 would be obtained without any need to withstand longitudinal shifts.

As described an embodiment of the method may comprise: in a thin plate, cut-out slots are made, interposed with parallel beams, these parallel beams being held together at their ends by lintels; the lintels and the beams are shaped around a circular chuck with an axis perpendicular to the lintels; and the circularly shaped lintels are twisted, with respect to each other, about an axis collinear with the axis of the chuck As described an embodiment of the method may comprise: in a thin plate, cut-out slots are made, interposed with parallel beams, these parallel beams being held together at their ends by lintels, the beams being inclined in relation to a direction perpendicular to the lintels; the thin plate thus cut out is deformed by being forced into a mold with a shape generated by revolution, with an axis of revolution orthogonal to the directions of the lintels; and the mold having an embossment in a central part between the ends that receive the lintels.

One skilled in the art may make or propose various modifications to the structure/way and/or function and/or result and/or steps of the disclosed embodiments and equivalents thereof without departing from the scope and extant of the invention.

What is claimed is:

1. A device for mounting a rotating member comprising:
   a mounting structure;
   a bore formed in the mounting structure;
   a ring housed in the bore; and
   a shaft, one end of the shaft inserted in the ring;
   wherein the ring comprises a diabolo shape, the diabolo shape comprising a set of inclined beams, the beams connected to a first crown of the ring and connected to a second crown of the ring.

2. The device according to claim 1 wherein the diabolo is formed by a hyperboloid structure.

3. The device according to claim 2 wherein in response to insertion of the shaft into the ring, the hyperboloid shape has an inner diameter that is wider than an initial diameter of the hyperboloid shape before the insertion of the shaft, the difference in curvature forming an elastic fit over the shaft.

4. The device according to claim 3 comprising twenty beams.

5. The device according to claim 3 wherein the inclination of the beams is about 50° relative to a plane perpendicular to the axis of the shaft.

6. The device according to claim 3 wherein the diabolo shape has a twist angle less than or greater 50°.

7. The device according to claim 3 wherein the hyperboloid structure is open along an aperture from the first crown to the second crown, the apertures in the first and second crowns being diametrically opposite each other.

8. The device according to claim 3 wherein the hyperboloid structure is open along an aperture, the aperture being made in two diametrically opposed parts of the first and second crowns.

9. The device according to claim 3 wherein the first and second crowns comprise a circular, cylindrical part with a generatrix line parallel to the axis of the shaft.

10. The device according to claim 3 wherein a second end of the shaft is disposed in a fixed structure, the fixed structure being more massive or having lower sensitivity to vibratory forces generating an acoustic source than the mounting structure.

11. The device according to claim 3 wherein a second end of the shaft is disposed in a fixed structure, the second end being supported by a second ring having a diabolo shape generated by a revolution about an axis of the shaft.

12. The device according to claim 2 comprising twenty beams.

13. The device according to claim 12 wherein the inclination of the beams is about 50° relative to a plane perpendicular to the axis of the shaft.

14. The device according to claim 12 wherein the diabolo shape has a twist angle less than or greater than 50°.

15. The device according to claim 12 wherein the hyperboloid structure is open along an aperture from the first crown to the second crown, the apertures in the first and second crowns being diametrically opposite each other.

16. The device according to claim 12 wherein the hyperboloid structure is open along an aperture, the aperture being made in two diametrically opposed parts of the first and second crowns.

17. The device according to claim 12 wherein the first and second crowns comprise a circular, cylindrical part with a generatrix line parallel to the axis of the shaft.

18. The device according to claim 12 wherein a second end of the shaft is disposed in a fixed structure, the fixed structure being more massive or having lower sensitivity to vibratory forces generating an acoustic source than the mounting structure.

19. The device according to claim 12 wherein a second end of the shaft is disposed in a fixed structure, the second end being supported by a second ring having a diabolo shape generated by a revolution about an axis of the shaft.

20. The device according to claim 2 wherein the inclination of the beams is about 50° relative to a plane perpendicular to the axis of the shaft.

21. The device according to claim 20 wherein the inclination of the beams is 50°±10°.

22. The device according to claim 21 wherein the hyperboloid structure is open along an aperture from the first crown to the second crown, the apertures in the first and second crowns being diametrically opposite each other.

23. The device according to claim 21 wherein the hyperboloid structure is open along an aperture, the aperture being made in two diametrically opposed parts of the first and second crowns.

24. The device according to claim 21 wherein the first and second crowns comprise a circular, cylindrical part with a generatrix line parallel to the axis of the shaft.

25. The device according to claim 21 wherein a second end of the shaft is disposed in a fixed structure, the fixed structure being more massive or having lower sensitivity to vibratory forces generating an acoustic source than the mounting structure.

26. The device according to claim 21 wherein a second end of the shaft is disposed in a fixed structure, the second end being supported by a second ring having a diabolo shape generated by a revolution about an axis of the shaft.

27. The device according to claim 20 wherein the inclination of the beams is 50°±5°.

28. The device according to claim 27 wherein the hyperboloid structure is open along an aperture from the first crown to the second crown, the apertures in the first and second crowns being diametrically opposite each other.

29. The device according to claim 27 wherein the hyperboloid structure is open along an aperture, the aperture being made in two diametrically opposed parts of the first and second crowns.

30. The device according to claim 27 wherein the first and second crowns comprise a circular, cylindrical part with a generatrix line parallel to the axis of the shaft.

31. The device according to claim 27 wherein a second end of the shaft is disposed in a fixed structure, the fixed structure being more massive or having lower sensitivity to vibratory forces generating an acoustic source than the mounting structure.

32. The device according to claim 27 wherein a second end of the shaft is disposed in a fixed structure, the second end being supported by a second ring having a diabolo shape generated by a revolution about an axis of the shaft.

33. The device according to claim 20 wherein the hyperboloid structure is open along an aperture from the first crown to the second crown, the apertures in the first and second crowns being diametrically opposite each other.

34. The device according to claim 20 wherein the hyperboloid structure is open along an aperture, the aperture being made in two diametrically opposed parts of the first and second crowns.

35. The device according to claim 20 wherein the first and second crowns comprise a circular, cylindrical part with a generatrix line parallel to the axis of the shaft.

36. The device according to claim 20 wherein a second end of the shaft is disposed a fixed structure, the fixed structure being more massive or having lower sensitivity to vibratory forces generating an acoustic source than the mounting structure.

37. The device according to claim 20 wherein a second end of the shaft is disposed in a fixed structure, the second end being supported by a second ring having a diabolo shape generated by a revolution about an axis of the shaft.

38. The device according to claim 2 wherein the diabolo shape has a twist angle less than or greater than 50°.

39. The device according to claim 38 wherein the hyperboloid structure is open along an aperture from the first crown to the second crown, the apertures in the first and second crowns being diametrically opposite each other.

40. The device according to claim 38 wherein the hyperboloid stricture is open along an aperture, the aperture being made in two diametrically opposed parts of the first and second crowns.

41. The device according to claim 2 wherein the hyperboloid structure is open along an aperture from the first crown to the second crown, the apertures in the first and second crowns being diametrically opposite each other.

42. The device according to claim 41 wherein the first and second crowns comprise a circular, cylindrical part with a generatrix line parallel to the axis of the shaft.

43. The device according to claim 41 wherein a second end of the shaft is disposed in a fixed structure, the fixed structure being more massive or having lower sensitivity to vibratory forces generating an acoustic source than the mounting structure.

44. The device according to claim 41 wherein a second end of the shaft is disposed in a fixed structure, the second end being supported by a second ring having a diabolo shape generated by a revolution about an axis of the shaft.

45. The device according to claim 2 wherein the hyperboloid structure is open along an aperture, the aperture being made in two diametrically opposed parts of the first and second crowns.

46. The device according to claim 45 wherein the first and second crowns comprise a circular, cylindrical part with a generatrix line parallel to the axis of the shaft.

47. The device according to claim 45 wherein a second end of the shaft is disposed in a fixed structure, the fixed structure being more massive or having lower sensitivity to vibratory forces generating an acoustic source than the mounting structure.

48. The device according to claim 45 wherein a second end of the shaft is disposed in. a fixed structure, the second end being supported by a second ring having a diabolo shape generated by a revolution about an axis of the shaft.

49. The device according to claim 2 wherein the first and second crowns comprise a circular, cylindrical part with a generatrix line parallel to the axis of the shaft.

50. The device according to claim 49 wherein a second end of the shaft is disposed in a fixed structure, the fixed structure being more massive or having lower sensitivity to vibratory forces generating an acoustic source than the mounting structure.

51. The device according to claim 49 wherein a second end of the shaft is disposed in a fixed structure, the second end being supported by a second ring having a diabolo shape generated by a revolution about an axis of the shaft.

52. The device according to claim 2 wherein a second end of the shaft is disposed in a fixed structure, the fixed structure being more massive or having lower sensitivity to vibratory forces generating an acoustic source than the mounting structure.

53. The device according to claim 2 wherein a second end of the shaft is disposed in a fixed structure, the second end being supported by a second ring having a diabolo shape generated by a revolution about an axis of the shaft.

54. The device according to claim 1 wherein the diabolo shape has a twist angle less than or greater than 50°.

55. The device according to claim 54 wherein the first and second crowns comprise a circular, cylindrical part with a generatrix line parallel to the axis of the shaft.

56. The device according to claim 54 wherein a second end of the shall is disposed in a fixed structure, the fixed structure being more massive or having lower sensitivity to vibratory forces generating an acoustic source than the mounting structure.

57. The device according to claim 54 wherein a second end of the shaft is disposed in a fixed structure, the second end being supported by a second ring having a diabolo shape generated by a revolution about an axis of the shaft.

58. The device according to claim 1 wherein a second end of the shaft is disposed in a fixed structure, the fixed structure being more massive or having lower sensitivity to vibratory forces generating an acoustic source than the mounting structure.

59. The device according to claim 1 wherein a second end of the shaft is disposed in a fixed structure, the second end being supported by a second ring having a diabolo shape generated by a revolution about an axis of the shaft.

60. The device according to claim 1 wherein the rotating member is an anode of an X-ray tube, the shaft being configured to receive the anode.

61. The device according to claim 1, wherein:
the diabolo shape of the ring is configured as though formed by a revolution about an axis of the shaft; and
the rotating member is configured to rotate about an axis aligned with the shaft.

* * * * *